United States Patent
Nicastro

(10) Patent No.: US 6,648,760 B1
(45) Date of Patent: Nov. 18, 2003

(54) SKILL MAPPING METHOD AND APPARATUS

(75) Inventor: Neil D. Nicastro, Lake Forest, IL (US)

(73) Assignee: Midway Amusement Games, LLC, Chicago, IL (US)

(*) Notice: Subject to any disclaimer, the term of this patent is extended or adjusted under 35 U.S.C. 154(b) by 0 days.

(21) Appl. No.: 09/671,131

(22) Filed: Sep. 27, 2000

(51) Int. Cl.[7] .............................................. G06F 17/00
(52) U.S. Cl. ........................ 463/23; 463/42; 434/353
(58) Field of Search ...................... 463/23, 42; 434/353

(56) References Cited

U.S. PATENT DOCUMENTS

| | | | |
|---|---|---|---|
| 4,285,517 A | 8/1981 | Morrison | 273/1 |
| 4,679,789 A | 7/1987 | Okada | 273/1 |
| 5,083,271 A | 1/1992 | Thacher et al. | 364/411 |
| 5,370,399 A | 12/1994 | Liverance | 273/434 |
| 5,683,082 A | 11/1997 | Takemoto et al. | 273/121 |
| 5,779,549 A | 7/1998 | Walker et al. | 463/42 |
| 5,813,913 A * | 9/1998 | Berner et al. | 463/23 |
| 5,917,725 A | 6/1999 | Thacher et al. | 364/410.1 |
| 5,971,850 A | 10/1999 | Liverance | 463/23 |
| 6,023,729 A * | 2/2000 | Samuel et al. | 463/42 |
| 6,024,643 A * | 2/2000 | Begis | 463/1 |
| 6,106,395 A * | 8/2000 | Begis | 463/23 |
| 6,128,660 A * | 10/2000 | Grimm et al. | 463/42 |
| 6,174,237 B1 * | 1/2001 | Stephenson | 434/322 |
| 6,322,451 B1 * | 11/2001 | Miura | 463/2 |
| 6,352,479 B1 * | 3/2002 | Sparks, II | 463/29 |

* cited by examiner

*Primary Examiner*—S. Thomas Hughes
*Assistant Examiner*—Corbutt B Coburn
(74) *Attorney, Agent, or Firm*—Jenkens & Gilchrist

(57) ABSTRACT

A skill mapping method and apparatus is used in connection with a game of skill including a plurality of predetermined measurable features and played by a plurality of players. The method includes selecting at least one of the predetermined measurable features; measuring each player's performance in the selected predetermined measurable features; comparing each player's performance with a standard; and mapping each player to a respective skill level based on each player's performance relative to the standard.

25 Claims, 2 Drawing Sheets

SKILL MAPPING METHOD AND APPARATUS

FIELD OF THE INVENTION

The present invention relates generally to games of skill and, more particularly, to a method and apparatus for mapping a player of a game to a certain skill level based on the player's performance in predetermined measurable features of the game.

BACKGROUND OF THE INVENTION

In sports such as bowling and golf, a handicapping system may be used to allow for equitable competition between players with widely varying abilities. The handicapping system typically assigns a handicap to a player based on the player's overall score in prior games. The poorer the player's score in the prior games, the greater the handicap. A drawback of such a handicapping system is that it facilitates cheating. For example, in a tournament that uses a player's overall score in earlier games to place the player in a particular skill bracket for the tournament, a highly skilled player could deliberately perform poorly in the earlier games so that the player is assigned to a lower skill bracket. In the tournament, the highly skilled player can then easily defeat his or her lesser skilled opponents who truly belong in the lower skill bracket. The present invention overcomes this drawback of typical handicapping systems.

SUMMARY OF THE INVENTION

A skill mapping method comprises providing a game of skill including a plurality of predetermined measurable features, the game being played by a plurality of players; measuring a performance of each player in at least one of the predetermined measurable features; mapping each player to a respective skill level based on the player's performance in the at least one of the predetermined measurable features.

A skill mapping apparatus comprises means for executing a game of skill including a plurality of predetermined measurable features, the game being played by a plurality of players; means for measuring a performance of each player in one of the predetermined measurable features; means for mapping each player to a respective skill level based on the player's performance in the one of the predetermined measurable features.

In one embodiment, the respective skill level to which each player is mapped is used to place each player in one of any number of skill brackets. For example, a system might include three levels such as beginner, intermediate, and advanced. Also, each player's skill level is optionally used to calculate a respective handicap value for modifying the player's actual score in the same or subsequent games.

BRIEF DESCRIPTION OF THE DRAWINGS

The foregoing and other advantages of the invention will become apparent upon reading the following detailed description and upon reference to the drawings in which.

Figure 1:
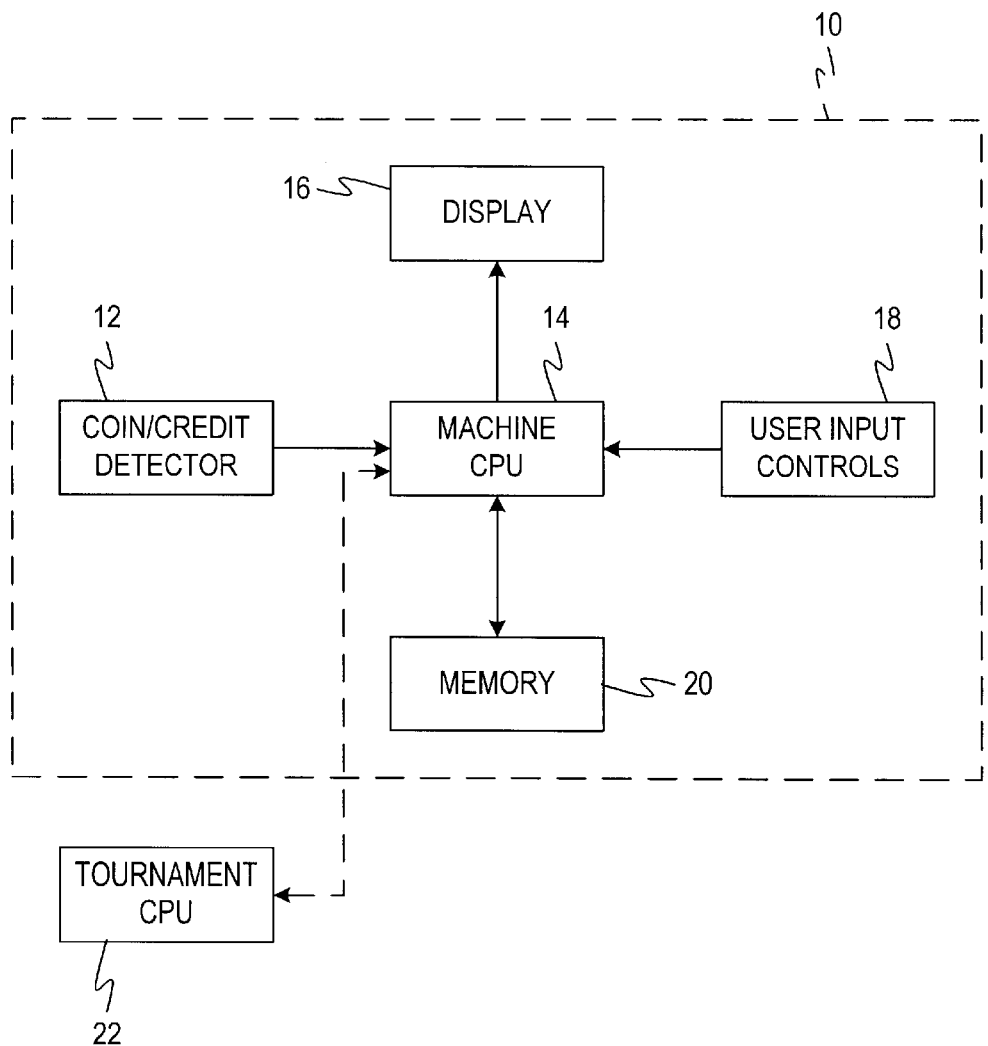
FIG. 1 is a block diagram of a control system suitable for operating a game of skill on an amusement machine.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF SPECIFIC EMBODIMENTS

Turning now to the drawings and referring initially to FIG. 1, there is depicted a control system 10 suitable for operating a game of skill on an amusement machine. The game of skill may, for example, involve simulated driving, simulated sports, simulated fighting, trivia, strategy, pinball, or other type of entertainment and is optionally played on a video display. The amusement machine may be adapted for use in the home or an arcade. A tournament may be run on the amusement machine itself or on a plurality of such amusement machines electrically interlinked for tournament play. In the case of interlinked amusement machines, the amusement machines may be located on a local area network at one site or on a wide area network such as the Internet at multiple sites. To facilitate equitable competition in such a tournament between players of varying abilities and, at the same time, minimize cheating, tournament players are mapped "on the fly" to certain skill levels according to the present invention.

In the control system 10 of FIG. 1, coin/credit detector 12 signals the amusement machine's central processing unit (CPU) 14 when a player has inserted a number of coins or played a number of credits. Then, the CPU 14 executes a game program stored in a system memory 20, thereby causing a visual display 16 to depict a game of skill responsive to player inputs via controls 18. The display 16 is preferably a video display such as a dot matrix, CRT, LED, LCD, or electro-luminescent display. Using the input controls 18, the player can start the game and manipulate game play elements on the video display. The game play elements may, for example, be a vehicle in a simulated driving game, a character and ball in a simulated sports game, a character in a simulated fighting game, answer choices in a multiple-choice trivia game, or selectable elements (e.g., cards, tiles, or other objects) in a strategy game. The input controls 18 vary depending upon the nature of the game of skill, but typically include one or more of the following: push-buttons, joystick, trackball, steering wheel/handle bars, brake, clutch, gear shifter, and a touch screen affixed to the display.

The system memory 20 stores control software, operational instructions, and data associated with the amusement machine. The system memory 20 may, for example, include read-only memory (ROM) and/or random-access memory (RAM). It will be appreciated, however, that the system memory 20 may be implemented on any of several alternative types of memory structures or may be implemented on a single memory structure.

The game of skill executed on the amusement machine includes a plurality of predetermined measurable features. The predetermined measurable features are selected such that players will perform differently in the same measurable feature as a result of differences in skill. Higher skilled players will generally perform better than lesser skilled players in the same measurable feature. The number and nature of possible measurable features depends upon the particular game of skill executed on the amusement machine.

In a typical driving video game, the player uses the input controls 18 to control a simulated vehicle on the display 16 in a race against time or other similar simulated vehicles controlled by the CPU and/or other human players. The simulated vehicle may, for example, be a racing car, motorcycle, boat, or snowmobile, and the race is typically run on a closed-circuit or open-road track. A driving game of the aforementioned type may include such predetermined measurable features as choice of vehicle from a selection menu, use of the vehicle's brake, use of the vehicle's clutch, number of times the vehicle hits a wall of the track, number of times the vehicle crashes, the use of shortcuts, the vehicle's speed at the entrance of a particular corner or turn of the track, the vehicle's speed at the exit of a particular corner or turn of the track, and the time to complete certain sections of the track.

In a baseball video game, the player uses the input controls 18 to swing the bat of a simulated baseball player (i.e., slugger) on the display 16. In a preferred baseball game for implementing the present invention, the baseball game is set up as a "home run derby" in which the player attempts to hit as many home runs as possible in a predetermined number of pitches or outs. A baseball game of the "home run derby" type may include such predetermined measurable features as choice of slugger from a selection menu that may be updated weekly with various statistics, timing and reflexes to hit (e.g., how close to a perfect swing of the bat), positioning of the slugger in the batter's box, choice of when to use one of a limited number of energy boosts that can improve the slugger's chances of hitting a home run, number of home runs, total distance of all home runs, total distance of all hits, player's selection of stadium forming the setting of the home run derby, and swing timing to direct ball (center field, left field, or right field).

In an American football video game, the player uses the input controls 18 to control a simulated football player, e.g., quarterback, runningbacks, receivers, or a defensive player, on the display 16. In a preferred football game for implementing the present invention, the football game is set up as a "touchdown frenzy" in which the football is placed at the opponent's 20 yard line (i.e., 20 yards from the end zone that the player or CPU is attempting to reach) and the player or CPU attempts to score as many points as possible in a predetermined amount of time or number of plays. When the player is on offense and the CPU is on defense, the player's objective is to score as many points as possible. When the CPU is on offense and the player is on defense, the player's objective is to limit the CPU to scoring as few points as possible. A football game of the "touchdown frenzy" type may include such predetermined measurable features as number of points scored when the player is on offense, number of points allowed when the player is on defense, average yards per play achieved when the player is on offense, average yards per play allowed when the player is on defense, average time per play, choice of team from a selection menu, how the player uses or reacts to simulated wind conditions, success on one particular play, and how many sacks when the player is on defense. Other sports like soccer may be set up in a similar manner as American football.

In a basketball video game, the player uses the input controls 18 to control a simulated basketball player on the display 16. In a preferred basketball game for implementing the present invention, the basketball game is set up as a "shootout" in which the player or CPU has one minute to shoot and make as many baskets as possible from different predetermined spots on the basketball court. When the player is on offense and the CPU is on defense, the player's objective is to score as many points as possible. When the CPU is on offense and the player is on defense, the player's objective is to limit the CPU to scoring as few points as possible. A basketball game of the "shootout" type may include such predetermined measurable features as selection of simulated basketball player from a selection menu, shot selection, success on a shot from one particular spot on the court, number of points scored when the player is on offense, number of points allowed when the player is on defense, amount of time between shots, number of blocked shots allowed when the player is on offense, and number of blocked shots achieved when the player is on defense.

In a golf video game entitled "Skins Game," the player uses the input controls 18 to control a simulated golfer, including the golfer's club selection and shots, on the display 16. This golf game allows players to perform spectacular golf shots like 500 yard drives, power putts and hooks and fades that defy the laws of physics and gravity. The game may be played in either a competitive mode or an "extreme" mode. In the "extreme" mode, players use spin and directional buttons of the input controls 18 to control the flight of a golf ball in mid-air in an effort to dodge hazards and glide the ball into a feather-soft landing on the putting surface surrounding a pin (i.e., the "green"). A golf game of the aforementioned type may include such predetermined measurable features as the distance from the golf ball to the pin after a shot (any shot), distance from the golf ball to the center of a fairway after a shot, type of landing (controllable by the input controls 18), club selection (does club selected by the player give a better result than the club suggested by the game?), time to shoot, landing on the green, use of slopes on the green (i.e., placement of shot and handling during putting), use of "extreme" spin and directional buttons to add distance and control placement of the golf ball, distance obtained from a golf shot compared to the maximum distance for a club used to make the shot, use of hook or slide to increase distance on golf shots, amount of movement of ball before achieving a good score (both very low movement and very high movement are good—one is most direct route and other makes up for mistakes), handling of wind, use of a "power" shot—both the selection of when to use and the advantage gained from use, and use of putting "assistants" in the form of video aids that appear for a certain amount of time during putts.

In a trivia game, the player uses the input controls 18 to answer a predetermined number of multiple-choice trivia questions on the display 16 as quickly as possible. The trivia game may include such predetermined measurable features as time it takes to answer certain trivia questions, number of trivia questions answered correctly, number of trivia questions answered incorrectly, overall time to finish answering all trivia questions, type of answers given (e.g., was it the "best" wrong answer or the "idiots only" wrong answer?), and average time to answer all of the trivia questions or a subset of questions.

In a strategy game entitled "Makhi," a large number of tiles having different colors are arranged in a rectangular grid. One of four or five different colors is applied to each tile. Using the input controls 18, the player selects groups of two or more tiles of the same color that are touching either horizontally or vertically to remove them from the grid. The greater the number of tiles that are removed for each selection, the greater the score. The "Makhi" game may include such predetermined measurable features as largest score achieved on one move, score after a certain time segment (e.g., after 10 seconds, then 20 seconds, etc.), score obtained during a particular time segment (e.g., between 15 and 25 seconds), attempts to move tiles around to create a bigger single score (smaller combinations of tiles lead to bigger combinations), percentage of grid cleared of tiles, the total time it takes to go as far as possible on the grid, and the average time it takes to make a selection.

In a strategy game entitled "Crystal Balls," the display 16 depicts a plurality of columns (vertical pockets) for receiving balls dropped into the columns from a top of the display 16. Each ball is assigned a color and a number. The player uses the input controls 18 to move a ball to a top of one of the columns and release the ball so that it drops into that column. The objective is to score points by matching three or more balls of the same color or number horizontally, vertically, or diagonally. The "Crystal Balls" game may include such predetermined measurable features as use of colors for scoring, use of numbers for scoring, use of diagonal lines for scoring, set up of balls to obtain combination of straight line scoring and diagonal scoring at the same time, speed selection of placement is made, score after certain time segments, and the number of times the game fills in rows automatically (scoring increases for every score when rows are filled in).

In a strategy game entitled "Three Peaks," the display 16 initially depicts playing cards arranged in three pyramids or "peaks." The playing cards of each pyramid are initially face up, while the remaining cards are initially face down. Using the input controls 18, the player turns a first card in a displayed deck of cards face up and can select and remove any one card with an adjacent number off the pyramids. The card removed from the pyramid becomes the deck card, allowing new selections and removals to be made relative to that card. When a card is removed from the pyramids such that another card is exposed, that exposed card is turned face up. When the player cannot remove another card from the pyramids based on the current card from the deck, the player takes a new card off the deck. The objective is to remove the cards from all three pyramids. As an example, if the deck card is a "3", the player can select a "2" or "4" (if face up) from the pyramids. If a "4" is selected, the "4" becomes the deck card and the player can then select a "3" or "5" (if face up) without taking a new deck card. The more cards in succession that are selected and removed from the pyramids without drawing a new deck card, the higher the number of points for that card. In one mechanism, the first card is worth one point, the second card is worth two points, the third card is worth three points, and so on. Points may also be increased in other geometric sequences. The "Three Peaks" game may include such predetermined measurable features as score at certain time segments, number of turns it takes to clear the first, second and third pyramids, longest sequential run of card removals, time to take first move, and time to take any particular move.

The foregoing game descriptions provide examples of how the present invention can be applied to various types of games. The present invention is applicable to all skill-based games.

Figure 2:
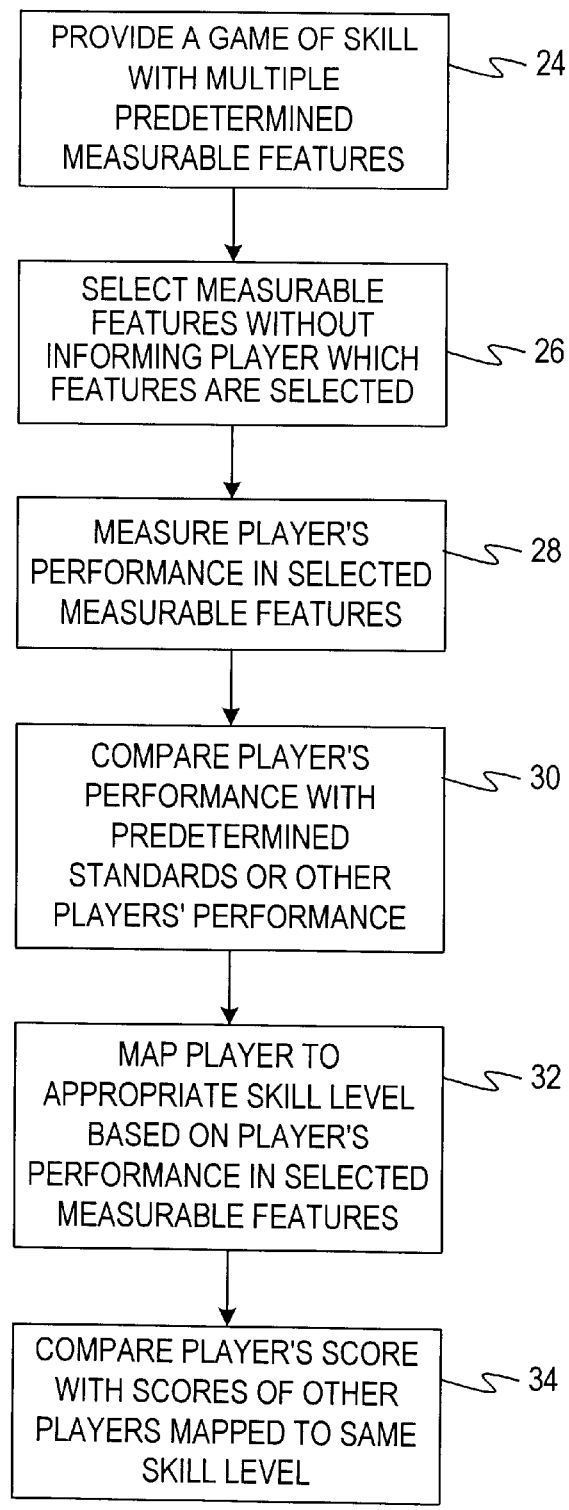
FIG. 2 is a flow diagram of a skill mapping method embodying the present invention.

In accordance with the present invention, FIG. 2 illustrates a skill mapping method used in connection with the game of skill and its plurality of predetermined measurable features. The skill mapping method may be performed by the amusement machine's CPU 14 if the tournament is implemented on only one amusement machine. If, however, the tournament is implemented on a plurality of interlinked amusement machines at one or more tournament sites, some of the steps of the skill mapping method may also be performed by a centralized tournament CPU 22 (see FIG. 1) coupled to the machine's CPU 14.

According to the skill mapping method, a game of skill with multiple predetermined measurable features is first provided at step 24. Examples of games of skill and associated possible measurable features are discussed above. Second, the CPU selects one or more of the measurable features to measure at step 26. This selection may be random or may be predetermined depending upon the tournament or tournament round. Prior to playing the game, the players in the tournament are not informed of the selected measurable features so that the players will not deliberately perform in a certain way in the selected features in an attempt to be mapped to a certain skill level. Third, the CPU collects appropriate data to measure each player's performance in the selected measurable features at step 28.

Fourth, the CPU compares each player's performance data with either predetermined standards/ranges/thresholds or other players' performance data at step 30. If compared with predetermined standards, the CPU may for example determine whether the performance data fits within a first range applicable to beginners, a second range applicable to intermediate players, or a third range applicable to advanced (expert) players. Of course, the number of ranges for defining skill levels is not limited to three but rather can be varied. If each player's performance data is compared with other players' performance data, the CPU may for example develop customized standards/ranges/thresholds based on the performance data from all players.

Fifth, the CPU maps each player to an appropriate skill level based on each player's performance in the selected measurable features at step 32. This skill mapping may be effective for the same tournament round and game in which the player's skill level is determined, or may only be effective for subsequent rounds of the tournament if the initial round is use primarily for skill mapping. In one embodiment, the respective skill level to which each player is mapped is used to place each player in a skill bracket such as beginner, intermediate, or advanced. Also, each player's skill level is optionally used to calculate a respective handicap value for modifying the player's actual score in the same or subsequent rounds of the same or a different tournament. If the skill mapping is based on more than one measurable feature, i.e., the CPU selects multiple measurable features at step 26, the CPU appropriately weighs a player's performance in each selected feature when determining the appropriate skill level to which the player should be mapped. For example, if the player performs at a beginner's level in one selected feature but performs at an advanced level in another selected feature, the player may be placed in an intermediate skill bracket.

Sixth, in a round of the tournament in which the skill mapping is effective, to determine the outcome of this tournament round the CPU compares each player's overall score with the scores of other players mapped to the same skill level at step 34. In the embodiment where players are placed in skill brackets, the overall scores of players in the same skill bracket are compared to each other to determine a winner. If each player's skill level is used to calculate a respective handicap value for modifying the player's actual score, the skill brackets are optional and the modified scores of the tournament players may be compared to each other to determine a winner.

The above-described skill mapping method facilitates the use of an "instant win" feature in which a player instantly wins a prize, such as cash, for achieving a predetermined scoring threshold. Without the skill mapping method, an operator would be inclined to set the scoring threshold at a very high level such that only advanced players would have an opportunity to achieve an instant win. With the skill mapping method, however, the operator can set different scoring thresholds for the respective skill levels such that beginners must achieve a low scoring threshold, intermediate players must achieve a medium scoring threshold, and advanced players must achieve a high scoring threshold for an instant win. Because players of all skill levels would have an opportunity to achieve an instant win, such players are more likely to be attracted to the amusement machine.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A skill mapping method comprises:
   providing a game of skill including a plurality of predetermined measurable features, the game being played by a plurality of players;
   selecting at least one selected predetermined measurable feature from said plurality of predetermined measurable features without informing said players which of said plurality of predeterined measurable features has been selected;
   measuring a performance of each player in at least one of the predetermined measurable features; and
   mapping each player to a respective skill level based on the player's performance in at least one of the selected predetermined measurable features.

2. The method of claim 1, further including placing each player in a skill bracket based on the respective skill level to which each player is mapped.

3. The method of claim 1, further including calculating a respective handicap value for modifying each player's actual score in that same game or subsequent games based on the respective skill level to which each player is mapped.

4. The method of claim 1, further including comparing each player's performance with predetermined standards to determine the respective skill level to which each player is subsequently mapped.

5. The method of claim 1, further including comparing each player's performance with the performance of other players to determine the respective skill level to which each player is subsequently mapped.

6. The method of claim 1, further including comparing each player's overall game score with the scores of other players mapped to a same skill level.

7. The method of claim 6, wherein the game of skill is played in multiple rounds of a tournament, the step of comparing each player's overall game score with the scores of other players mapped to a same skill level being performed in the same round of the tournament as the step of mapping each player to a respective skill level.

8. The method of claim 6, wherein the game of skill is played in multiple rounds of a tournament, the step of comparing each player's overall game score with the scores of other players mapped to a same skill level being performed in a later round of the tournament than the step of mapping each player to a respective skill level.

9. The method of claim 1, wherein the step of mapping each player to a respective skill level separates the plurality of players into groups with respective skill levels.

10. The method of claim 1, further including awarding one or more instant prizes to a player at each skill level for achieving a predetermined scoring threshold in the game of skill.

11. The method of claim 1, wherein the step of measuring a performance of each player in at least one of the selected predetermined measurable features includes measuring the performance of each player in multiple selected predetermined measurable features.

12. A skill mapping method comprising:
   providing a game of skill including a plurality of predetermined measurable features, the game being played by a plurality of players;
   selecting at least one selected predetermined measurable feature from said plurality of predetermined measurable features without informing said players which of said plurality of predetermined measurable features has been selected;
   measuring each player's performance in the at least one selected predetermined measurable feature;
   comparing each player's performance with a predetermined standard; and
   mapping each player to a respective skill level based on each player's performance relative to the predetermined standard.

13. The method of claim 12, further including placing each player in a skill bracket based on the respective skill level to which each player is mapped.

14. The method of claim 12, further including calculating a respective handicap value for modifying each player's actual score in that same game or subsequent games based on the respective skill level to which each player is mapped.

15. The method of claim 12, further including comparing each player's overall game score with the scores of other players mapped to a same skill level.

16. The method of claim 12, further including awarding one or more instant prizes to a player at each skill level for achieving a predetermined scoring threshold in the game of skill.

17. A skill mapping apparatus, comprising
   means for providing a game of skill including a plurality of predetermined measurable features, the game being played by a plurality of players;
   means for selecting one or more selected predetermined measurable features from said plurality of predetermined measurable features without informing said players which of said predetermined measurable features has been selected;
   means for measuring a performance of each player in at least one of the predetermined measurable features; and
   means for mapping each player to a respective skill level based on the player's performance in the one of the predetermined measurable features.

18. The apparatus of claim 17, further including means for placing each player in a skill bracket based on the respective skill level to which each player is mapped.

19. The apparatus of claim 17, further including means for calculating a respective handicap value for modifying each player's actual score in that same game or subsequent games based on the respective skill level to which each player is mapped.

20. The apparatus of claim 17, further including means for comparing each player's performance with predetermined standards to determine the respective skill level to which each player is subsequently mapped.

21. The apparatus of claim 17, further including means for comparing each player's performance with the performance of other players to determine the respective skill level to which each player is subsequently mapped.

22. The apparatus of claim 17, further including means for comparing each player's overall game score with the scores of other players mapped to a same skill level.

23. The apparatus of claim 17, wherein the means for mapping each player to a respective skill level separates the plurality of players into groups with respective skill levels.

24. The apparatus of claim 17, further including means for awarding one or more instant prizes to a player at each skill level for achieving a predetermined scoring threshold in the game of skill.

25. A skill mapping method, comprising:

provic a game of skill including a plurality of predetermined measurable features, the game being played by a plurality of players;

selecting at least one selected predetermined measurable feature from said plurality of predetermined measurable features without informing said players which of said predetermined measurable features has been selected;

measuring each player's performance in said at least one selected predetermined measurable feature, said at least one selected predetermined measurable feature having a predetermined standard associated therewith;

mapping each player to a respective skill level based on each player's performance relative to the predetermined standard; and calculating a respective handicap value for modifying each player's actual score in that same game or subsequent games based on the respective skill level to which each player is mapped.

* * * * *

UNITED STATES PATENT AND TRADEMARK OFFICE
CERTIFICATE OF CORRECTION

PATENT NO.   : 6,648,760 B1
DATED        : November 18, 2003
INVENTOR(S)  : Neil D. Nicastro It is certified that error appears in the above-identified patent and that said Letters Patent is hereby corrected as shown below:

Column 7,
Line 24, delete "perdeterined" and insert -- predetermined --.
Line 27, before "predetermined" please insert -- selected --.

Signed and Sealed this

Twenty-third Day of March, 2004

JON W. DUDAS
*Acting Director of the United States Patent and Trademark Office*